United States Patent
Murakami

(10) Patent No.: US 11,163,289 B2
(45) Date of Patent: Nov. 2, 2021

(54) CONTROL DEVICE, TERMINAL DEVICE, CRADLE, NOTIFICATION SYSTEM, CONTROL METHOD, AND STORAGE MEDIUM

(71) Applicant: SHARP KABUSHIKI KAISHA, Sakai (JP)

(72) Inventor: Noriaki Murakami, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 21 days.

(21) Appl. No.: 16/486,335

(22) PCT Filed: Dec. 20, 2017

(86) PCT No.: PCT/JP2017/045678
§ 371 (c)(1),
(2) Date: Aug. 15, 2019

(87) PCT Pub. No.: WO2018/154945
PCT Pub. Date: Aug. 30, 2018

(65) Prior Publication Data
US 2019/0369593 A1    Dec. 5, 2019

(30) Foreign Application Priority Data
Feb. 24, 2017   (JP) .............................. JP2017-033791

(51) Int. Cl.
*H04W 68/00* (2009.01)
*G05B 19/402* (2006.01)
(Continued)

(52) U.S. Cl.
CPC ........... *G05B 19/402* (2013.01); *G06F 3/165* (2013.01); *G06K 9/00362* (2013.01);
(Continued)

(58) Field of Classification Search
CPC ........ G05B 19/402; G05B 2219/39482; G06F 3/165; G06K 9/00362; H04B 1/3877; H04W 68/005
See application file for complete search history.

(56) References Cited

U.S. PATENT DOCUMENTS

2006/0058079 A1   3/2006   Goto
2007/0032262 A1   2/2007   Namatame et al.
(Continued)

FOREIGN PATENT DOCUMENTS

CN   103859792 A   6/2014
JP   2006-041746 A   2/2006
(Continued)

OTHER PUBLICATIONS

Co-Pending Letter regarding the US Co-Pending U.S. Appl. Nos. 16/487,578 and 16/487,590.
(Continued)

*Primary Examiner* — Gary Collins
(74) *Attorney, Agent, or Firm* — ScienBiziP, P.C.

(57) ABSTRACT

An aspect of the present disclosure more effectively provides notification of information. A control section (10) includes: a person detecting section (13) configured to detect a person in a case where it has been detected that a target event has occurred; an output control section (14) configured to control a speaker (50) to output audio indicating the target event in a case where the target event has occurred; and a command preparing section (15) configured to (i) transmit a rotation instruction to a charging station (2) in a case where detection of a person is to be commenced and (ii) transmit a subtle rotation instruction in a case where the person has been detected.

8 Claims, 12 Drawing Sheets

(51) Int. Cl.
  *G06F 3/16* (2006.01)
  *G06K 9/00* (2006.01)
  *H04B 1/3877* (2015.01)
(52) U.S. Cl.
  CPC ........ *H04B 1/3877* (2013.01); *H04W 68/005* (2013.01); *G05B 2219/39483* (2013.01)

(56) References Cited

U.S. PATENT DOCUMENTS

| | | | | |
|---|---|---|---|---|
| 2011/0228098 A1* | 9/2011 | Lamb | ...................... | G01S 17/86 348/164 |
| 2012/0062691 A1* | 3/2012 | Fowler | ............... | F16M 11/2014 348/36 |
| 2012/0083314 A1* | 4/2012 | Ng | ........................ | H04N 5/2252 455/557 |
| 2012/0120267 A1* | 5/2012 | Kuroda | .................. | F16M 11/10 348/211.9 |
| 2012/0220338 A1* | 8/2012 | Degrazia | ........... | H04M 1/72519 455/556.1 |
| 2013/0229569 A1* | 9/2013 | Bevirt | ................. | H04N 5/23296 348/373 |
| 2014/0118554 A1* | 5/2014 | Bucknor | ............ | G06K 9/00771 348/155 |
| 2015/0077555 A1* | 3/2015 | Scalisi | ................. | H04M 1/0291 348/143 |
| 2016/0261824 A1* | 9/2016 | Scalisi | ...................... | F21K 9/23 |
| 2017/0155831 A1* | 6/2017 | Jang | ................... | G06K 9/00604 |
| 2018/0174584 A1* | 6/2018 | Chih | ...................... | F16M 11/10 |

FOREIGN PATENT DOCUMENTS

| | | |
|---|---|---|
| JP | 2006-086848 A | 3/2006 |
| JP | 2007-049562 A | 2/2007 |
| JP | 2007-104363 A | 4/2007 |

OTHER PUBLICATIONS

Non-Final Office Action dated Oct. 28, 2020 for U.S. Appl. No. 16/487,578.

* cited by examiner

CONTROL DEVICE, TERMINAL DEVICE, CRADLE, NOTIFICATION SYSTEM, CONTROL METHOD, AND STORAGE MEDIUM

TECHNICAL FIELD

The present invention relates to, for example, a control device which controls a terminal device mounted to a rotatable cradle.

BACKGROUND ART

A terminal device such as a mobile phone typically uses audio and images to notify a user of a message requiring notification, such as a received call or email.

CITATION LIST

Patent Literature

[Patent Literature 1]
Japanese Patent Application Publication Tokukai No. 2006-041746 (Publication Date: Feb. 9, 2006)

SUMMARY OF INVENTION

Recently, techniques have been developed for providing notification of a message via a method other than audio and images. For example, Patent Literature 1 discloses techniques in which a notification of a target event (for example, a phone call, an email, or an alarm) that has occurred in a mobile terminal is provided to a user by controlling a charging station (to which the mobile terminal is mounted) to carry out an operation in accordance with the type of the target event.

However, the techniques of Patent Literature 1 involve notification via an operation carried out by the charging station without use of audio. Depending on the user, such a notification may be difficult to notice, and therefore the notification may be missed by the user. An aspect of the present invention has been made in view of the above problem. An object of an aspect of the present invention is to provide, for example, a control device capable of more effectively providing notification of various information.

Solution to Problem

In order to solve the above problem, a control device in accordance with an aspect of the present invention is a control device which controls a terminal device mounted to a cradle, including: a person detecting section configured to search for and detect a person in an area surrounding the terminal device with use of information indicating a state of the area surrounding the terminal device, in a case where a specific event has occurred in the terminal device; an output control section configured to control an output section to output audio indicating the specific event; an instruction transmitting section configured to (i) transmit a first rotation instruction to the cradle in a case where the person detecting section is to commence a search, the first rotation instruction being for rotating the cradle and (ii) transmit a second rotation instruction to the cradle in a case where, as a result of the search, the person detecting section has detected the person, the second rotation instruction being for rotating the cradle in a mode of rotation which mode differs from that of the first rotation instruction.

In order to solve the above problem, a method of control for a control device in accordance with an aspect of the present invention is a method of control for a control device which controls a terminal device mounted to a cradle, the method including the steps of: (a) searching for and detecting a person in an area surrounding the terminal device with use of information indicating a state of the area surrounding the terminal device, in a case where a specific event has occurred in the terminal device; (b) controlling an output section to output audio indicating the specific event; (c) transmitting a first rotation instruction to the cradle in a case where a search is to be commenced in the step (a), the first rotation instruction being for rotating the cradle; and (d) transmitting a second rotation instruction to the cradle in a case where, as a result of the search, the person has been detected, the second rotation instruction being for rotating the cradle in a mode of rotation which mode differs from that of the first rotation instruction.

Advantageous Effects of Invention

An aspect of the present invention makes it possible to more effectively provide notification of various information.

DESCRIPTION OF EMBODIMENTS

Embodiment 1

Figure 2:
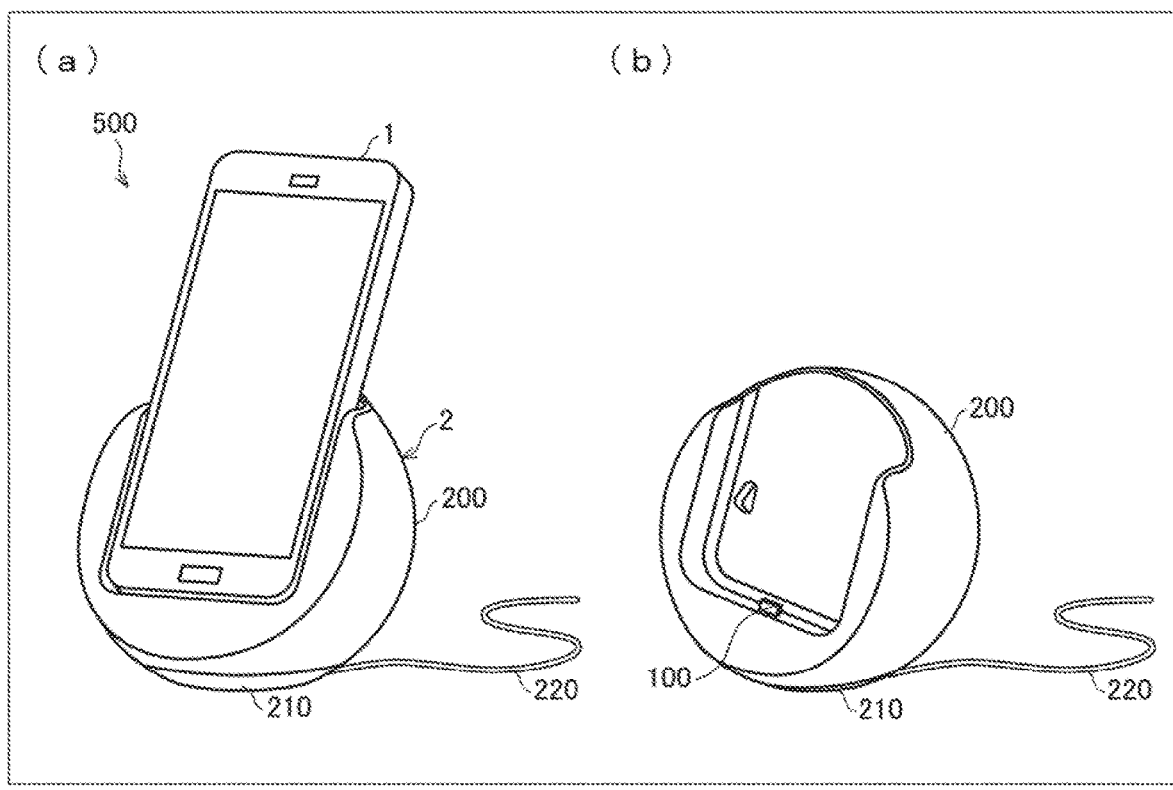
FIG. 2 is a diagram illustrating an external appearance of the smartphone and the charging station.

The following description will discuss Embodiment 1 of the present disclosure in detail. A notification system in accordance with Embodiment 1 includes a terminal device, a control device which controls the terminal device, and a charging station to which the terminal device can be mounted. With reference to FIG. 2, the following description will discuss example external appearances of the terminal device and the charging station.

Overview of Notification System

FIG. 2 is a diagram illustrating an external appearance of a smartphone 1 and a charging station 2 which are included in a notification system 500 in accordance with Embodiment 1. (a) of FIG. 2 illustrates the smartphone 1 and the charging station 2 in a state where the smartphone 1 has been mounted to the charging station 2.

The smartphone 1 is a terminal device which provides notifications to a person in the vicinity of the smartphone 1. These notifications are described in detail later, but as one example, the smartphone 1 uses audio from a speaker to notify a person in the vicinity of the smartphone 1 of a notification-requiring event which has occurred in the smartphone 1 or which has been received from another device. The smartphone 1 may be, for example, a terminal device such as a mobile phone or a tablet PC. The smartphone 1 includes the control device (control section 10; described later) which controls various functions of the smartphone 1, such as the above-described audio notifications.

The charging station 2 is a cradle to which the smartphone 1 can be mounted. Note that it is not essential for the charging station 2 to have a charging function. The charging station 2 is capable of rotating while the smartphone 1 is mounted to the charging station 2. More specifically, the charging station 2 includes a steadying section 210 and a housing 200. The charging station 2 may include a cable 220 for connection to a power source.

The steadying section 210 is a base portion of the charging station 2 which steadies the charging station 2 when the charging station 2 is placed on, for example, a floor or a desk. The housing 200 is a portion in which the smartphone 1 is to be seated. The shape of the housing 200 is not particularly limited, but is preferably a shape which can reliably hold the smartphone 1 during rotation. In a state where the housing 200 holds the smartphone 1, the housing 200 can be rotated by motive force from a motor (motor 120, operation section; described later) which is provided inside the housing 200. A direction in which the housing 200 rotates is not particularly limited. The following descriptions assume an example in which the housing 200 rotates left and right around an axis which is substantially perpendicular to a surface on which the steadying section 210 is placed.

(b) of FIG. 2 is a diagram illustrating an external appearance of the charging station 2 in a state where the smartphone 1 is not mounted to the charging station. The housing 200 includes a connector 100 for connection with the smartphone 1. The charging station 2 receives various instructions (commands) from the smartphone 1 via the connector 100 and operates in accordance with the commands. This will be described in detail later.

Configuration of Main Parts

Figure 1:
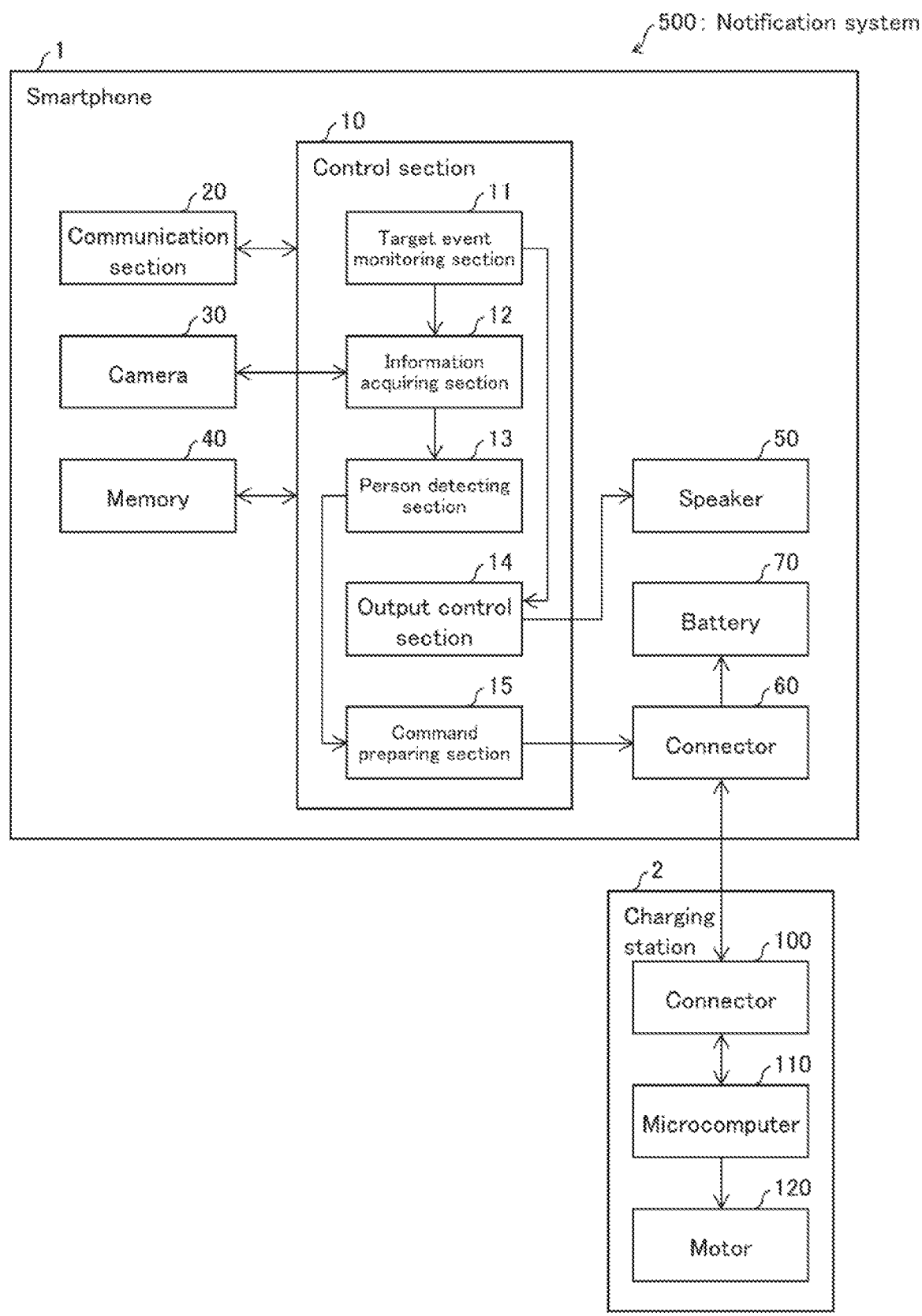
FIG. 1 is a diagram illustrating a configuration of main parts of a smartphone and a charging station which are included in notification system in accordance with Embodiment 1 of the present disclosure.

F is a block diagram illustrating an example configuration of main parts of the smartphone 1 and the charging station 2. As illustrated in FIG. 1, the smartphone 1 includes a communication section 20, a camera 30, the control section (control device) 10, memory 40, a speaker (output section) 50, a connector 60, and a battery 70.

The communication section 20 carries out communication between the smartphone 1 and other devices by sending and receiving information. The communication section 20 transmits to the control section 10 information received from other devices. As one example, when an incoming call is received from another smartphone, the communication section 20 notifies the control section 10 that the incoming call is being received. As another example, when an email is received from another smartphone 1, the communication section 20 notifies the control section 10 that the email has been received. The camera 30 is an input device for obtaining information indicating a state of an area surrounding the smartphone 1.

The camera 30 captures still images or moving images of the area surrounding the smartphone 1. The camera 30 carries out image capture at a predetermined time interval and transmits image capture data to an information acquiring section 12 of the control section 10. The camera 30 is preferably provided so as to face a direction which is the same as at least one of a direction which a display screen of the smartphone 1 faces and a direction which the speaker of the smartphone 1 faces. This makes it possible for the camera 30 to obtain image capture data indicating a state of an area within a predetermined range centered on the direction which the smartphone 1 is facing (i.e., within a range for which the camera 30 is capable of image capture).

The control section 10 carries out overall control of the smartphone 1. The control section 10 includes a target event monitoring section 11, the information acquiring section 12, a person detecting section (speech direction identifying section) 13, an output control section 14, and a command preparing section (instruction transmitting section) 15.

The target event monitoring section 11 monitors occurrence and ending of target events. The word "target event" refers to a specific event which has been specified in advance, in the smartphone 1, as being an event which a user should be notified of. Examples of target events include placing and receiving a phone call, sending and receiving an email, commencement and termination (completion) of charging of the smartphone 1, and notifications from various applications that have been downloaded to the smartphone 1.

Once the target event monitoring section 11 has detected the occurrence of a target event, the target event monitoring section 11 notifies the information acquiring section 12 that the target event has occurred and notifies the output control section 14 of the type of target event that has occurred. Once the target event monitoring section 11 detects that a target event has ended, the target event monitoring section 11 notifies the information acquiring section 12 and the output control section 14 that the target event has ended.

Note that the target event monitoring section 11 may constantly monitor the occurrence of target events while the smartphone 1 is powered on. Alternatively, the target event monitoring section 11 may skip monitoring the occurrence of target events in a case where the smartphone 1 is set to a mode in which notification via audio and images is forbidden, such as a silent mode or an power-saving mode.

The information acquiring section 12 acquires the image capture data. Once the target event monitoring section 11 notifies the information acquiring section 12 that a target event has occurred, the information acquiring section 12 acquires the image capture data from the camera 30 at a predetermined time interval. Whenever the information acquiring section 12 acquires the image capture data, the information acquiring section 12 transmits the image capture data to the person detecting section 13. This enables the person detecting section 13 (described later) to search for a person at substantially the same time as (i) image capture by the camera 30 and (ii) image capture data acquisition by the information acquiring section 12. Once the target event monitoring section 11 notifies the information acquiring section 12 that the target event has ended, the information acquiring section 12 in turn notifies the person detecting section 13 that the target event has ended.

The information acquiring section 12 may control turning on and off the camera 30. For example, the information acquiring section 12 may turn on the camera 30 in a case where the target event monitoring section 11 has notified the information acquiring section 12 that a tai t event has occurred. The information acquiring section 12 may turn off the camera 30 in a case where the target event monitoring section 11 has notified the information acquiring section 12 that a target event has ended. The information acquiring section 12 may also turn off the camera 30 in a case where the person detecting section 13 has detected a person. This makes it possible to prevent an increase in power consumption by the smartphone 1 which increase would otherwise be caused by the camera 30 operating when image capture data is unnecessary (that is, when the below-described search for a person is not being carried out).

The person detecting section 13 searches for and detects a person in the area surrounding the smartphone 1 with use of the image capture data. Specifically, the person detecting section 13 analyzes the image capture data obtained from the information acquiring section 12 so as to search for a person in that image capture data. In a case where a person is in the image capture data, the person detecting section 13 detects that person as a person in the area surrounding the smartphone 1. A method of analyzing the image capture data is not particularly limited. As one example, it is possible to identify whether or not a person is in the image capture data by using pattern matching to determine whether or not at least a portion of the image capture data matches a pattern image of a person which pattern image is stored in the memory 40.

In a case where the person detecting section 13 is to commence a search for a person (analysis of the image capture data), the person detecting section 13 notifies the command preparing section 15 of such. In a case where the person detecting section 13 has detected a person, the person detecting section 13 notifies the information acquiring section 12 and the command preparing section 15 of such. In a case where the information acquiring section 12 has notified the person detecting section 13 that a target event has ended, the person detecting section 13 ends the search for the person and notifies the command preparing section 15 that the search has ended.

In the case of a configuration where commencement of search for a person or the detection of a person serves as trigger for the output control section 14 (described later) to commence audio output, the person detecting section 13 also notifies the output control section 14 of the commencement of search for a person or the detection of a person.

The output control section 14 controls the speaker 50 to output audio in accordance with the type of target event which the target event monitoring section 11 provided notification of. The output control section 14 also controls the speaker 50 to stop audio output in a case where the target event monitoring section 11 has notified the output control section 14 that the target event has ended.

The timing of audio output controlled by the output control section 14 may be set as appropriate. For example, the output control section 14 may control audio output to start as soon as the output control section 14 has received a notification from the target event monitoring section 11. As an alternative example, the output control section 14 may control audio output to start in a case where (i) the output control section 14 has received a notification from the target event monitoring section 11 and (ii) the person detecting section 13 has commenced a search for a person. As another alternative example, the output control section 14 may control audio output to start in a case where (i) the output control section 14 has received a notification from the target event monitoring section 11 and (ii) the person detecting section 13 has detected a person.

The command preparing section 15 prepares an instruction (command) for the charging station 2 and transmits the instruction to the charging station 2. In a case where the person detecting section 13 has notified the command preparing section 15 that the person detecting section 13 is to commence a search for a person, the command preparing section 15 prepares a rotation instruction (first rotation instruction), which is an instruction for causing the housing 200 of the charging station 2 to rotate. The command preparing section 15 then transmits the rotation instruction to the charging station 2 via the connector 60. In a case where the person detecting section 13 has notified the command preparing section 15 that the person detecting section 13 has detected a person, the command preparing section 15 prepares a subtle rotation instruction (second rotation instruction), which is an instruction for causing the housing 200 of the charging station 2 to make a subtle rotation. The command preparing section 15 then transmits the subtle rotation instruction to the charging station 2 via the connector 60.

Details of the terms "rotation" and "subtle rotation" are as follows. In Embodiment 1, "rotation" refers to causing the housing 200 of the charging station 2 to freely rotate within the range of possible rotation angle of the housing 200. As described above, the command preparing section 15 transmits a rotation instruction in a case where a search for a person is to be commenced. As such, the command preparing section 15 may, for example, transmit to the charging station 2 a rotation instruction which causes the housing 200 to rotate through the widest possible angle of rotation, such that the camera 30 can capture images throughout the widest possible range.

In contrast, the term "subtle rotation" at least indicates rotation in a mode of rotation which mode differs from that of the above "rotation". For example, the command preparing section 15 may transmit to the charging station 2 a subtle rotation instruction which is for causing the housing 200 to rotate through an angle of rotation which is (i) smaller than the angle of rotation instructed by the rotation instruction and measured with respect to the direction that the housing 200 faces when the person detecting section 13 detects the person. Controlling the charging station 2 to make a subtle rotation allows the smartphone 1 to more easily make a person in the area surrounding the smartphone 1 aware of a notification.

Furthermore, when the person detecting section 13 has detected a person, the command preparing section 15 may transmit a stop instruction that instructs the charging station 2 to stop the rotation which is being carried out in accordance with the rotation instruction. Because it is not essential for the charging station 2 to rotate after a person has been detected, transmitting the stop instruction makes it possible to prevent the charging station 2 from rotating unnecessarily. The direction that the housing 200 of the charging station 2 faces when the housing 200 stops after the command preparing section 15 has transmitted the stop instruction and may be considered to be the direction that housing 200 faces when the person detecting section 13 detects the person. Furthermore, the command preparing section 15 may transmit a subtle rotation instruction for causing the housing 200 to repeatedly rotate left and right through a predetermined angle of rotation which is measured with respect to the direction that the housing 200 faced when it was stopped.

Controlling the charging station 2 to make a subtle rotation in this way enables the smartphone 1 to control the charging station 2 to repeatedly rotate through an angle of rotation measured with respect to a direction of the person. This makes it possible to cause the smartphone 1 to, for example, appear as if the smartphone 1 is moving in a manner similar to shaking one's head while facing the person. This allows the smartphone 1 to more easily make a person in the area surrounding the smartphone 1 aware of a notification. Note that the command preparing section 15 prepares the stop instruction and transmits the stop instruction to the charging station 2 also in a case where the person detecting section 13 has notified the command preparing section 15 that the search for the person is to be ended.

The memory 40 stores various types of data used in the smartphone 1. The memory 40 may store, for example, a pattern image of a person which the person detecting section uses for pattern matching, audio data for output controlled by the output control section 14, and templates for commands to be prepared by the command preparing section 15. The speaker 50 is an output device which outputs audio in response to control by the output control section 14.

The connector 60 is an interface for an electrical connection between the smartphone 1 and the charging station 2. The battery 70 is a power source of the smartphone 1. The connector 60 sends to the battery 70 power obtained from the charging station 2, so that the battery 70 is charged. Note that a method of connecting the connector 60 and the connector 100 of the charging station 2 (described later) is not particularly limited. The respective physical shapes of the connector 60 and the connector 100 are not particularly limited. Each of these connectors can be embodied in the form of, for example, a universal serial bus (USB) terminal.

Configuration of Main Parts of the Charging Station 2

As illustrated in the drawings, the charging station 2 includes the connector 100, a microcomputer (instruction receiving section) 110, and the motor (operation section) 120. The charging station can be connected to, for example, a home electrical outlet or a power source (not illustrated) such as a battery via the cable 220.

The connector 100 is an interface for an electrical connection between the charging station and the smartphone 1. In a case where the charging station 2 is connected to a power source, the connector 100 sends, via the connector 60 of the smartphone 1 to the battery 70, power obtained from the power source by the charging station 2, so that the battery 70 is charged.

The microcomputer 110 carries out overall control of the charging station 2. The microcomputer 110 receives commands from the smartphone 1 via the connector 100. The microcomputer 110 controls operations of the motor 120 in accordance with received commands. Specifically, in a case where the microcomputer 110 has received the rotation instruction from the smartphone 1, the microcomputer 110 controls the motor 120 in a manner so as to rotate the housing 200. In a case where the microcomputer 110 has received the subtle rotation instruction from the smartphone 1, the microcomputer 110 controls the motor 120 in a manner so that the housing 200 makes a subtle rotation.

The motor 120 is a motor for rotating the housing 200. The motor 120 operates or stops in accordance with control from the microcomputer 110 so as to rotate or stop the housing 200.

Target Event Notification

Figure 3:
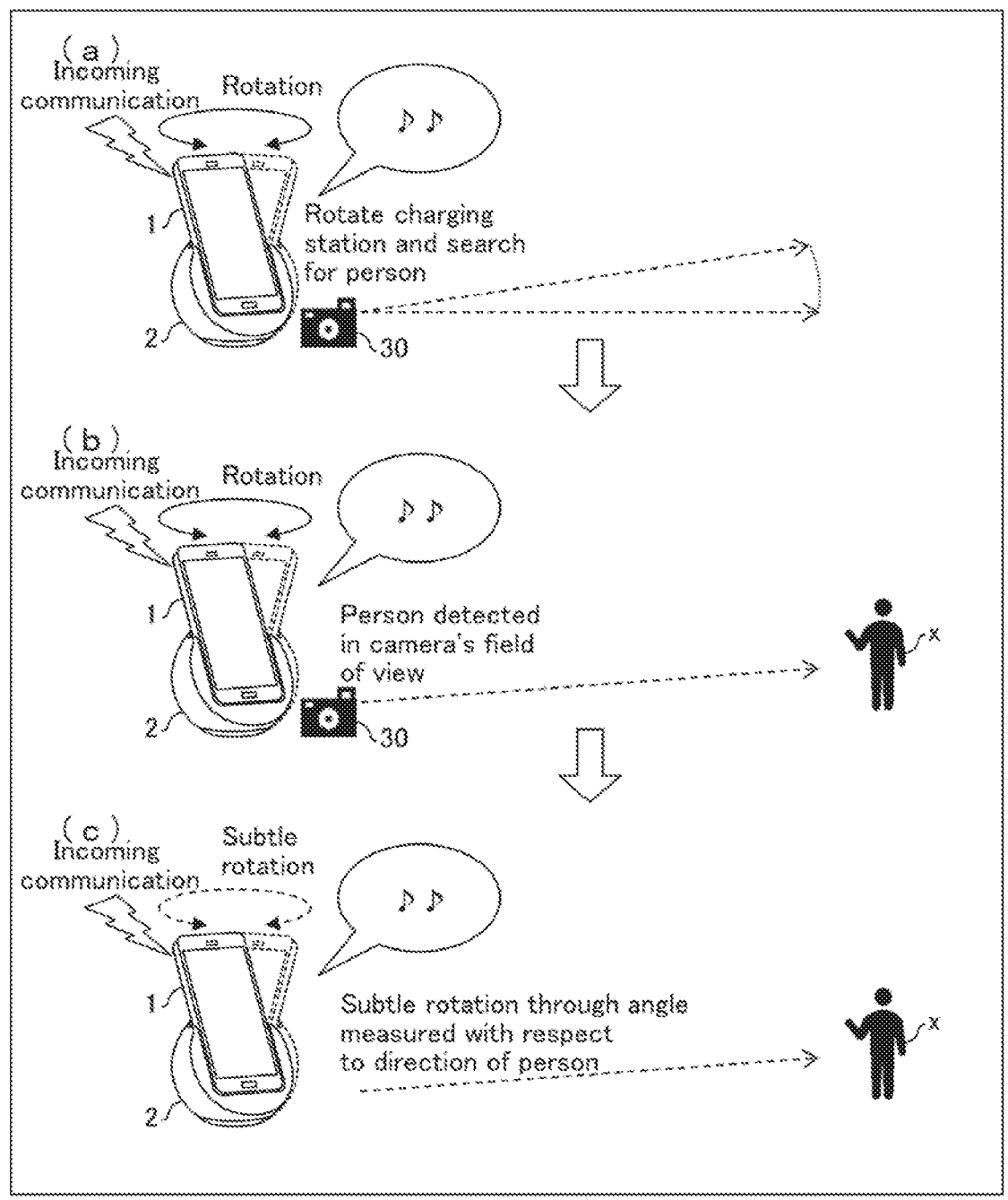
FIG. 3 is a diagram illustrating an example operation of the smartphone and the charging station in a case where the smartphone receives an incoming communication.

Each of (a) to (c) of FIG. 3 is a diagram illustrating an example operation of the smartphone 1 and the charging station 2 in a case where the smartphone 1 receives an incoming communication. In a case where an incoming communication is being received from, for example, another smartphone 1, the communication section 20 notifies the control section 10 of the incoming communication. The target event monitoring section 11 of the control section 10 then notifies the information acquiring section 12 that a target event has occurred and notifies the output control section 14 of the type of the target event (i.e., receipt of incoming communication). Upon receiving the notification, the output control section 14 controls the speaker 50 to output a ringtone. Thereafter, the output control section 14 causes the ringtone to be outputted until the receipt of the incoming communication has ended (until the output control section 14 received notification from the target event monitoring section 11 that the receipt of the incoming communication has ended) ((a) of FIG. 3).

Once the information acquiring section 12 receives from the target event monitoring section 11 the notification that the target event has occurred, the information acquiring section 12 turns on the camera 30, acquires image capture data, and transmits the image capture data to the person detecting section 13. Upon obtaining the image capture data, the person detecting section 13 notifies the command preparing section 15 that a search for a person is to be started. In response to the notification, the command preparing section 15 transmits a rotation instruction to the microcomputer 110 of the charging station 2. Upon receiving the rotation instruction, the microcomputer 110 of the charging station 2 starts up the motor 120 in accordance with the instruction. This causes the housing 200 of the charging station 2 to commence rotating in accordance with the rotation instruction ((a) of FIG. 3).

Because the smartphone 1 is mounted to the housing 200, once the housing 200 begins rotating, the image capture angle of the camera 30 also changes in along with the rotation. For example, in a case where the housing 200 rotates 180°, the camera 30 continuously captures images (or a video) of the vicinity of the smartphone 1 through approximately 180°. The camera 30 constantly transmits resulting image capture data to the person detecting section 13. This enables the person detecting section 13 to detect a person in the vicinity of the smartphone 1 (for example, a user x in FIG. 3) from image capture data of differing ranges ((b) of FIG. 3).

Once the person detecting section 13 has detected the user x, the command preparing section 15 prepares a subtle rotation instruction and transmits the subtle rotation instruction to the charging station 2. The microcomputer 110 of the charging station 2 causes the housing 200 to make a subtle rotation in accordance with the instruction. For example, the microcomputer 110 causes the housing 200 to rotate through an angle which is (i) smaller than that of the rotations of (a) to (b) of FIG. 3 and (ii) measured with respect to a direction which the housing 200 was facing when the person detecting section 13 detected a person (in other words, the direction the housing 200 was facing when the subtle rotation instruction was received) of FIG. 3).

This makes it possible to provide notification of the occurrence of a target event (i.e., receipt of an incoming communication) by use of audio from the speaker 50, while the smartphone 1 is searching for a person. As such, the smartphone 1 makes it possible to more easily make a person (user x) in the area surrounding the smartphone 1 aware of a notification.

Figure 4:
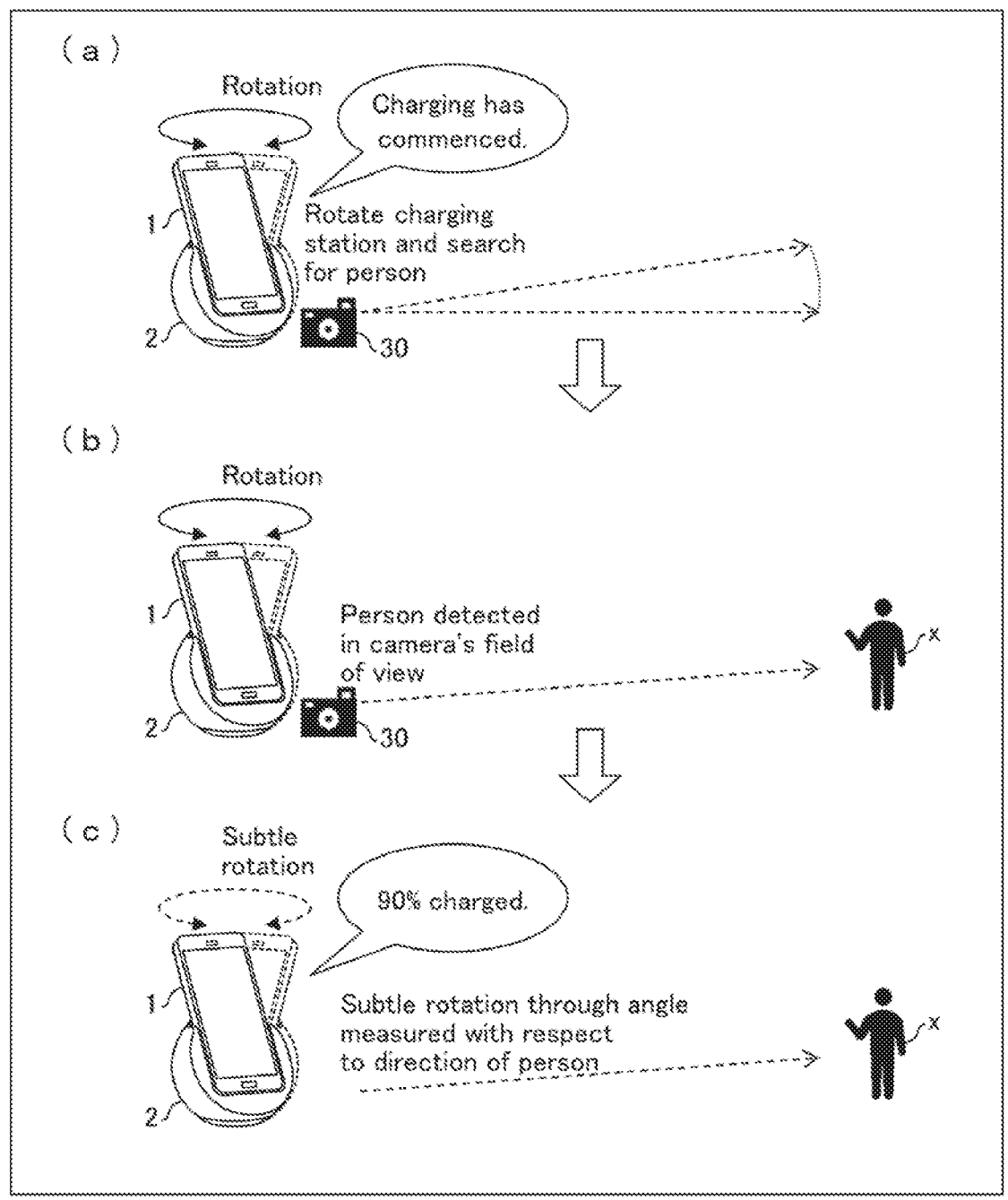
FIG. 4 is a diagram illustrating an example operation of the smartphone and the charging station in a case where the smartphone is to carry out a notification regarding charging.

Each of (a) to (c) of FIG. 4 is a diagram illustrating an example operation of the smartphone 1 and the charging station 2 in a case where the smartphone 1 (or an application downloaded to the smartphone 1) is to carry out a notification regarding charging. Note that the following description omits explanation of operations of the smartphone 1 and the charging station 2 that are similar to those carried out in (a) to (c) of FIG. 3.

The example illustrated in (a) to (c) of FIG. 4 differs from the example illustrated in (a) to (c) of FIG. 3 in terms of the timing of audio output controlled by the output control section 14. In the example of FIG. 4, once the output control section 14 receives notification of commencement of charging from the target event monitoring section 11, the output control section 14 carries out control to output audio indicating the commencement of charging ((a) of FIG. 4). Thereafter, the control section 10 carries out a search for a person ((b) of FIG. 4) in the same manner as in (b) of FIG. 3. Note that in the case of (b) of FIG. 4 it is not necessary for the output control section 14 to cause the audio to be outputted while the search for the person is being carried out.

Once the person detecting section 13 has detected the user x, the person detecting section 13 notifies the output control section 14 that the user x has been detected. The output control section 14 then controls the speaker 50 to output audio indicating the current amount of power which has been charged (in other words, the remaining power level of the battery) ((c) of FIG. 4). At this time, a subtle rotation instruction from the command preparing section 15 causes the charging station 2 to make a subtle rotation. As such, it is possible for the output control section 14 to carry out control so that audio is outputted along with the subtle rotation.

In this case, the smartphone 1 provides notification of the occurrence of a target event via audio from the speaker 50 when a person has been detected. This enables the smartphone 1 to reliably notify a person (user x) in the area surrounding the smartphone 1 of a target event that has occurred.

Note that the command preparing section 15 may transmit a stop instruction to the charging station 2 concurrently with audio output from the speaker 50, and then, after the audio output has ended, once again transmit a subtle rotation instruction. In other words, the control section 10 may provide notification to the user by causing the subtle rotation of the charging station 2 and audio output from the speaker 50 of the smartphone 1 to be carried out in an alternating manner.

Process Flow

Figure 5:
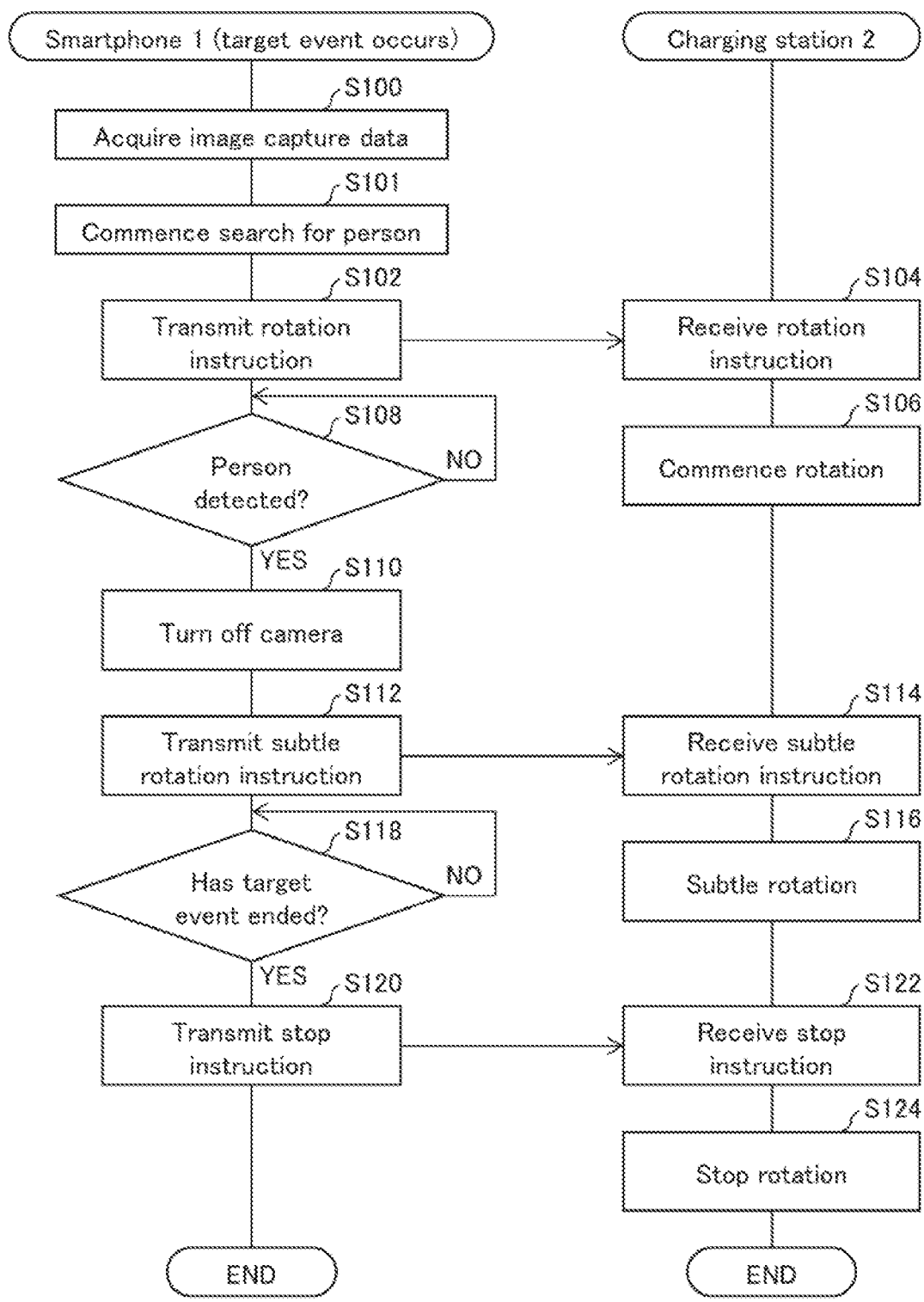
FIG. 5 is a flowchart illustrating a process carried out by the smartphone and the charging station for rotating the charging station.

FIG. 5 is a flowchart illustrating a flow of a process carried out by the smartphone 1 and the charging station 2 for rotating the charging station 2. The process of FIG. 5 is carried out in a case where a target event occurs in the smartphone 1.

Once a target event occurs in the smartphone 1, the target event monitoring section 11 of the control section 10 detects the occurrence of the target event and notifies the information acquiring section 12 and the output control section 14. Upon receiving the notification, the information acquiring section 12 turns on the camera 30 and acquires image capture data (S100). The person detecting section 13 commences a search for a person at substantially the same time the camera 30 is turned on (S101, person searching step). Once the person detecting section 13 commences the search for a person, the command preparing section 15 prepares a rotation instruction and transmits the rotation instruction to the charging station 2 (S102, instruction transmitting step). Once the microcomputer 110 of the charging station 2 receives the rotation instruction (S104), the microcomputer 110 controls the motor 120 to operate in accordance with the instruction so that the housing 200 commences rotating (S106). Thereafter, the microcomputer 110 continues to control the motor 120 in accordance with the rotation instruction until the microcomputer 110 receives a further instruction from the command preparing section 15.

The person detecting section 13 searches for and detects a person by acquiring and analyzing image capture data indicating the vicinity of the smartphone 1 (S108). In a case where the person detecting section 13 fails to detect a person from the acquired image capture data ("NO" in S108), the person detecting section 13 waits to receive the next image capture data from the information acquiring section 12. In a case where the person detecting section 13 has detected a person from the acquired image capture data ("YES" in S108), the person detecting section 13 notifies the information acquiring section 12 and the command preparing section 15 that a person has been detected. Upon receiving the notification, the information acquiring section 12 turns off the camera 30 (S110). In a case where the person detecting section 13 has detected a person, the output control section 14 controls the speaker 50 to output audio in accordance with the target event (output control step). Note that the audio output may also be carried out from before the detection of a person.

Once the command preparing section 15 receives the notification that the person detecting section 13 has detected a person, the command preparing section 15 prepares a subtle rotation instruction and transmits the subtle rotation instruction to the charging station 2 (S112, instruction transmitting step). Once the microcomputer 110 of the charging station receives the subtle rotation instruction (S114), the microcomputer 110 control the motor 120 to operate in accordance with the instruction so that the housing 200 makes a subtle rotation (S116). Thereafter, the microcomputer 110 continues to control the motor 120 in accordance with the subtle rotation instruction until the microcomputer 110 receives a further instruction from the command preparing section 15.

Thereafter, the control section 10 waits until the target event monitoring section 11 detects that the target event has ended (i.e., waits while the result is "NO" in S118). Once the target event monitoring section 11 detects that the target event has ended ("YES" in S118), the output control section controls the speaker 50 to stop outputting audio. Furthermore, the command preparing section 15 prepares a stop instruction and transmits the stop instruction to the charging station 2 (S120). The microcomputer 110 of the charging station 2 receives the stop instruction (S122) and stops the motor 120 in accordance with the instruction so that the housing 200 stops rotating (S124).

The above process makes it possible for the person detecting section 13 to search for (detect) a person with use of image capture data obtained while the smartphone 1 faces differing directions. Furthermore, in a case where a person has been detected, the smartphone 1 does the following: (i) control the charging station 2 to make a subtle rotation, which is a mode of rotation that differs from the rotation carried out during the search for a person; and (ii) control the speaker 50 to output audio. As such, the smartphone 1 is able to use a combination of audio and a rotation operation by the charging station 2 to notify a person in the area surrounding the smartphone 1, i.e., a person who is presumed to be the user, that a target event has occurred. The smartphone 1 therefore makes it possible to more effectively provide notification of various information.

Note that in a case where the person detecting section fails to detect a person ("NO" in S108) and predetermined amount of time has elapsed, the person detecting section 13 may end the detection of the person and notify the command preparing section 15 that the detection has ended. The command preparing section 15 may then prepare and transmit a stop instruction S120), and the microcomputer 110 of the charging station 2 may accordingly control the motor 120 to stop (S122 to S124).

In a case where a predetermined amount of time has elapsed after the command preparing section 15 transmits the subtle rotation instruction (S112), the command preparing section 15 may prepare and transmit a stop instruction (S120), and the microcomputer 110 of the charging station 2 may accordingly control the motor 120 to stop (S122 to S124).

Note that the smartphone 1 in accordance with Embodiment 1 may include another input device such as a sensor, in addition to or instead of the camera 30. This other input device may obtain information indicating a state of the vicinity of the smartphone 1 and transmit the information to the information acquiring section 12.

For example, the smartphone 1 may include a microphone in addition to or instead of the camera 30. The information acquiring section 12 may acquire audio recording data which is created by the microphone making an audio recording of sound produced in a certain range around the smartphone 1. In a case where the audio recording data (and image capture data) includes human speech, the person detecting section 13 may consider that a person has been detected inn the area surrounding the smartphone 1.

Embodiment 2

A control device in accordance with the present disclosure may receive audio input and identify a direction from which the audio emanated. Furthermore, the control device may commence rotation of a housing of a cradle from a position at which the housing faces the direction thus identified. The following description will discuss Embodiment 2 of the present disclosure with reference to FIGS. 6 and 7. For convenience, in the embodiments described below, members similar in function to those described in Embodiment 1 will be given the same reference signs, and their description will be omitted.

Figure 6:
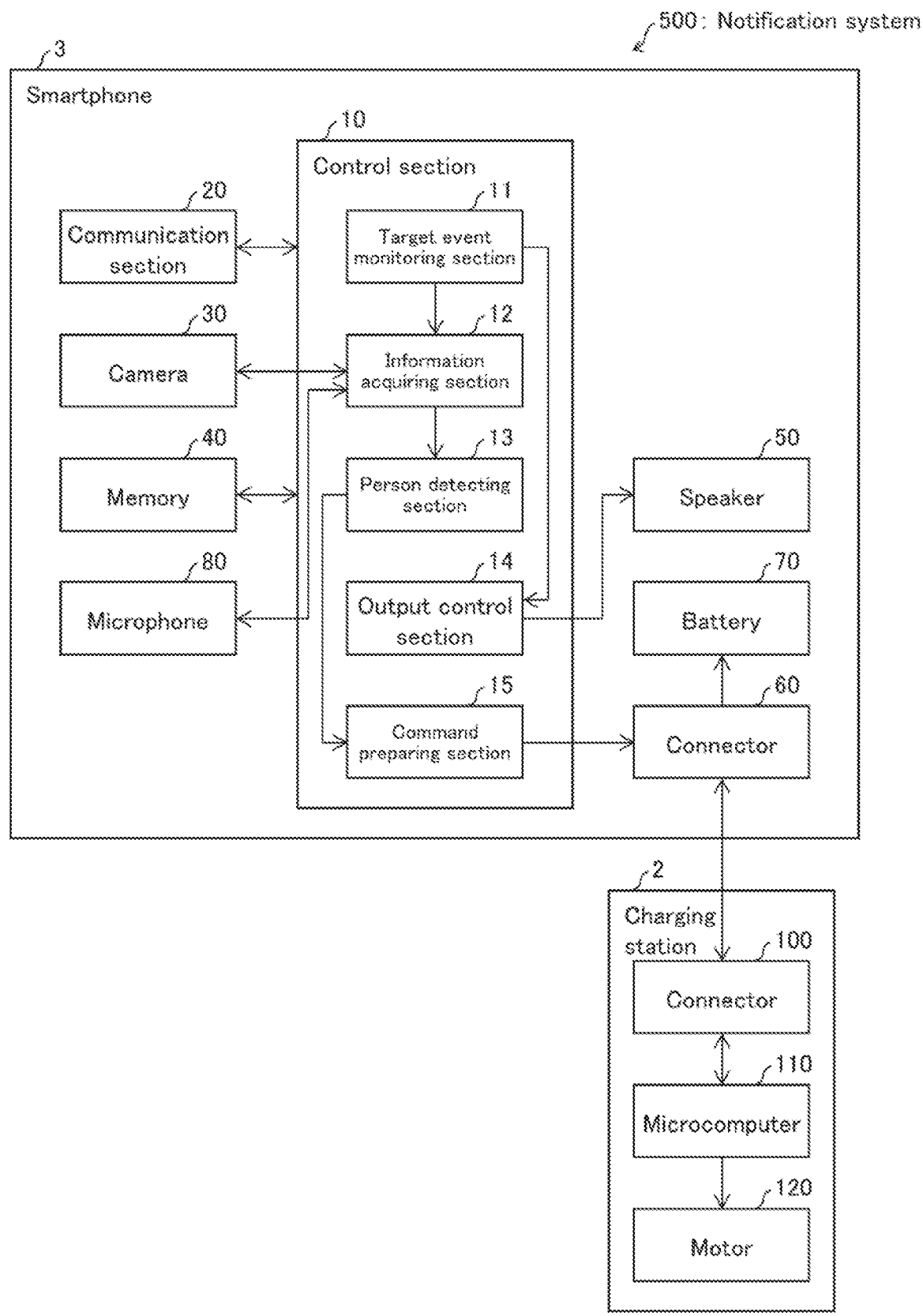
FIG. 6 is a diagram illustrating a configuration of main parts of a smartphone and a charging station in accordance with Embodiment 2 of the present disclosure.

FIG. 6 is a diagram illustrating a configuration of main parts of a smartphone 3 and a charging station 2 in accordance with Embodiment 2. The smartphone 3 in accordance with Embodiment 2 differs from the smartphone 1 described in the above embodiments by including a microphone 80. The microphone 80 is a device for making an audio recording of speech produced in a certain range in the area surrounding the smartphone 3. The microphone 80 makes an audio recording of sound produced in the area surrounding the smartphone 3 and transmits audio recording data to an information acquiring section 12. The microphone 80 may be constantly on, or may be turned on and off in accordance with instructions from a control section 10.

The information acquiring section 12 transmits the audio recording data, obtained from the microphone 80, to a person detecting section 13. The person detecting section 13 analyzes the audio recording data received from the information acquiring section 12 and determines whether or not the audio recording data includes speech by a person. In a case where the audio recording data does include speech by a person, the person detecting section 13 further identifies a direction from which the speech was produced (for example, an angle formed by (i) the direction which the smartphone 3 and the charging station 2 are facing and (ii) the origin of the speech). The method used for analyzing the audio recording data may be a conventional method.

The person detecting section 13 then notifies command preparing section 15 of the following: (i) information indicating the direction from which the speech was produced; and (ii) that the person detecting section 13 will commence a search for a person. Upon receiving these notifications, the command preparing section 15 prepares a rotation instruction and transmits the rotation instruction to a microcomputer 110 of the charging station 2. The rotation instruction prepared at this time includes the information indicating the direction from which the speech was produced.

Figure 7:
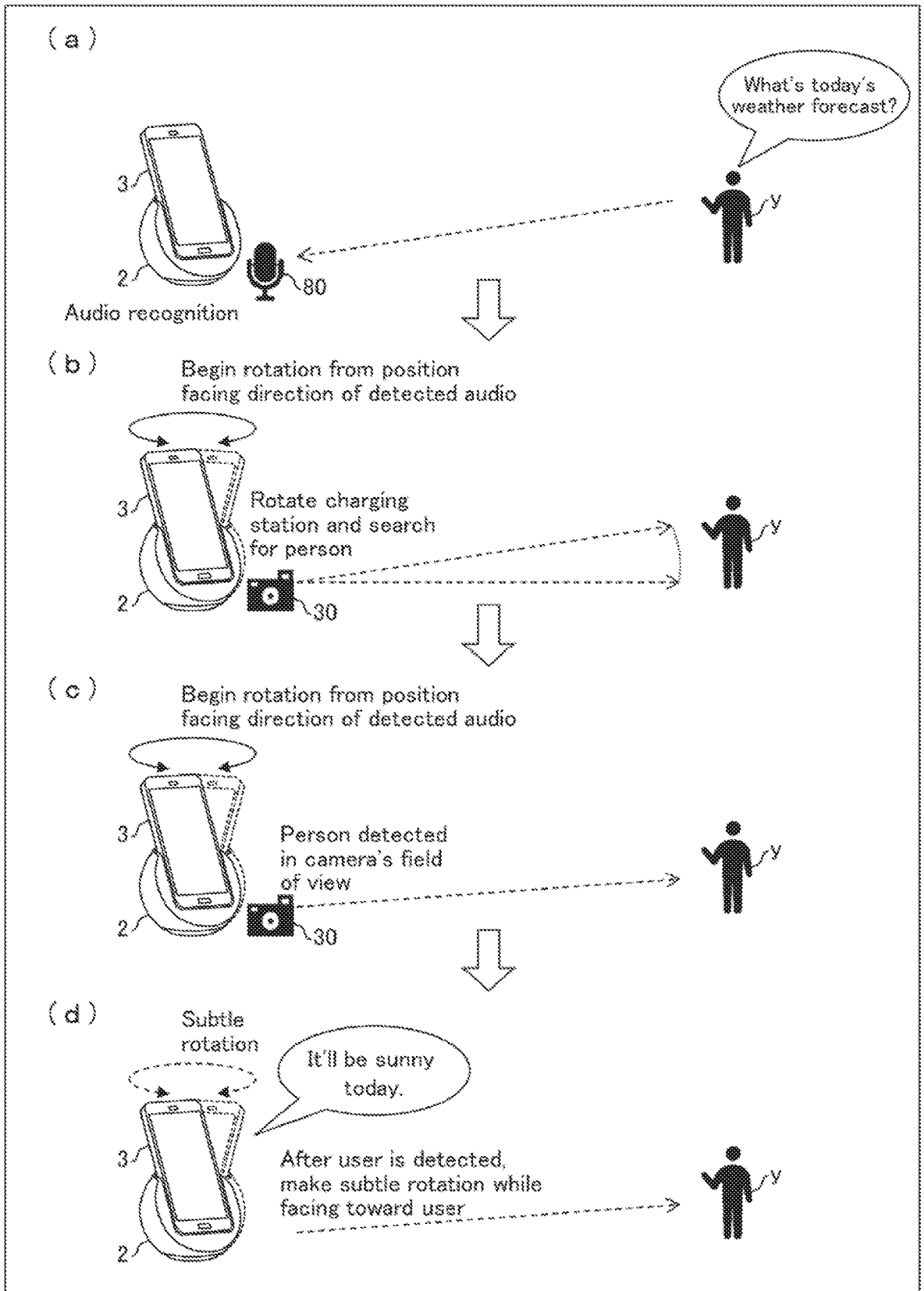
FIG. 7 is a diagram illustrating an example operation of the smartphone and the charging station in a case where a user who is in the area surrounding the smartphone has spoken.

FIG. 7 is a diagram illustrating an example operation of the smartphone 3 and the charging station 2 in a case where a user y who is in the area surrounding the smartphone 3 has spoken. In a case where the user y speaks in the vicinity of the smartphone 3 ((a) of FIG. 7), the microphone 80 makes an audio recording of the speech, and the person detecting section 13 identifies, from the audio recording data, a direction of the user y. The command preparing section 15 then transmits to the microcomputer 110 a rotation instruction which includes information indicating the direction thus identified. The microcomputer 110 then causes the housing 200 to commence rotating from a position at which the housing 200 faces the direction indicated by the rotation instruction, i.e., a direction of the user y ((b) of FIG. 7). The operations of (c) and (d) of FIG. 7 carried out thereafter are similar to the operations of (b) and (c) of FIG. 4.

Note that the target event monitoring section 11 may recognize the detection of speech by the microphone 80 as being an event that has occurred. For example, in a case where (i) the microphone 80 has made an audio recording of a question from the user such as that shown in (a) of FIG. 7, and (ii) the control section 10 analyzes the audio recording and identifies an answer in response to the content of the question, the target event monitoring section 11 may recognize the answer as being an event that has occurred. Then, as illustrated in (d) of FIG. 7, the output control section 14 may carry out control so as to output audio that is an answer to the content of speech by the user y.

Embodiment 3

A control device in accordance with the present disclosure may transmit, as a rotation instruction to a cradle, an instruction that instructs the cradle to repeatedly rotate while gradually changing the angle of rotation. The following description will discuss Embodiment 3 of the present disclosure with reference to FIGS. 8 and 9. A control section 10 in accordance with Embodiment 3 differs from the control section 10 of Embodiment 1 in that, in the former, command preparing section 15 transmits a rotation instruction for causing a housing 200 to rotate repeatedly while gradually increasing the angle of rotation.

The rotation instruction includes, for example, a designation of a direction of rotation (left or right, in Embodiment 3) and a designation of an angle of rotation. A microcomputer 110 may control a motor 120 so that the housing 200 rotates in the direction designated in the rotation instruction and through the angle designated in the rotation instruction.

Figure 8:
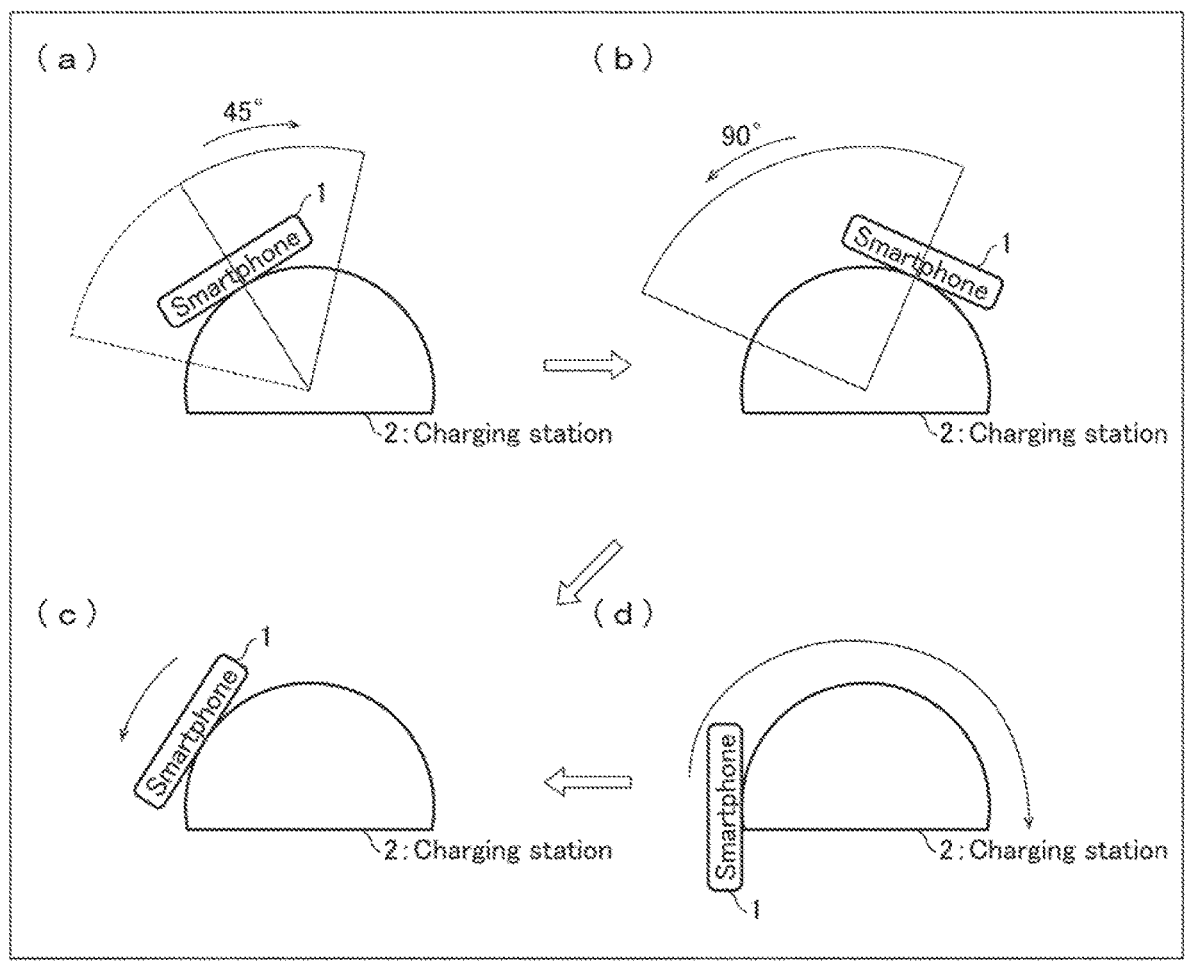
FIG. 8 is a diagram illustrating an example of rotation by a housing of a charging station in accordance with Embodiment 3 of the present disclosure.
Figure 9:
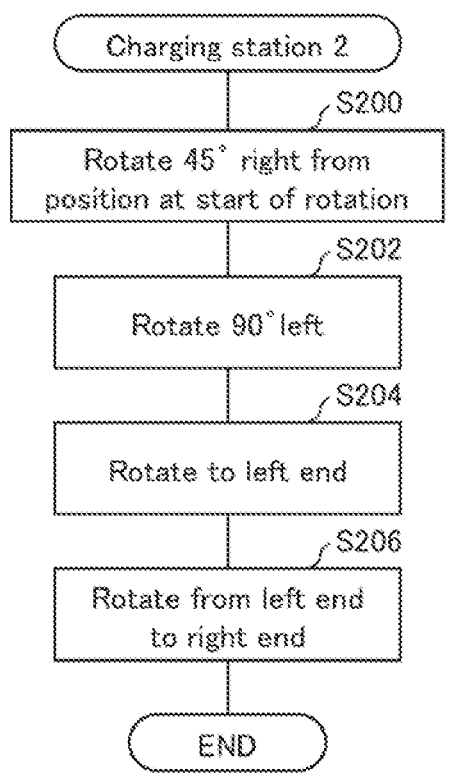
FIG. 9 is a diagram illustrating a flow of a process carried out by a microcomputer of the charging station which has received a rotation instruction from the smartphone.

For example, the rotation instruction enables rotation as illustrated in FIGS. 8 and 9. FIG. 8 is a diagram illustrating an example of rotation by the housing 200 of the charging station 2 in accordance with Embodiment 3. FIG. 9 is a diagram illustrating a flow of a process carried out by the microcomputer 110 which has received the rotation instruction. Note that the rotation angles and rotation directions discussed in the following descriptions are merely examples which do not serve to limit the how the housing 200 rotates.

First, the microcomputer 110 causes a smartphone 1 or smartphone 3 to rotate 45° toward the right, around an axis which is substantially perpendicular to a surface on which the cradle is placed ((a) of FIG. 8 and S200 of FIG. 9). Thereafter, the microcomputer 110 causes the housing 200 to rotate 90° in the opposite direction, i.e., toward the left ((b) of FIG. 8 and S202 of FIG. 9). In other words, the microcomputer 110 causes the housing 200 to rotate through a predetermined angle (45°) both to the left and to the right, the predetermined angle being measured with respect to a position of the housing 200 at commencement of rotation (a position of the housing 200 at commencement of search).

In a case where the microcomputer 110 does not receive a stop instruction during these rotations (that is, in a case where the person detecting section 13 fails to detect a person), the microcomputer 110 causes the housing 200 to rotate to the left through a maximum angle possible (that is, rotate to a left end) ((c) of FIG. 8 and S204 of FIG. 9).

In a case where the microcomputer 110 does not receive a stop instruction during the rotation illustrated in (c) of FIG. 8 and S204 of FIG. 9, the microcomputer 110 causes the housing 200 to rotate to the right through a maximum angle possible (that is, rotate to a right end). In other words, the microcomputer 110 causes the housing 200 to rotate from the left end to the right end ((d) of FIG. 8 and S206 of FIG. 9).

Note that the microcomputer 110 may increase the speed of rotation of the housing 200 in places where the range of rotation is redundant. This makes it possible for the camera 30 of the smartphone 1 or the smartphone 3 to more quickly capture images of a wide range. It is therefore possible for the person detecting section 13 to more quickly detect a person. Furthermore, the command preparing section 15 may transmit to the charging station 2 a single rotation instruction which includes all instructions for the series of rotation operations illustrated in FIGS. 8 and 9. Alternatively, the command preparing section 15 may divide these instructions, for example, in accordance with each step of FIG. 9.

In a case where there is a person in the image capture range of the camera 30, image capture data will include that person. Because the direction which the smartphone 1 faces changes along with rotation of the charging station 2, the image capture range of the camera 30 also changes along with the rotation. In this way, the person detecting section 13 searches for and detects a person from image capture data which changes in accordance with the direction which the smartphone 1 faces. In a case where a direction of a person is not far off from the direction which the charging station 2 faces at commencement of rotation, controlling the charging station 2 to repeatedly rotate while gradually increasing the angle of rotation makes it possible to more quickly detect the person, as compared to a configuration in which, for example, the charging station 2 begins by rotating through a maximum angle possible. In other words, the smartphone 1 makes it possible to efficiently detect a person in the area surrounding the smartphone 1.

Typically, the charging station 2 will often be placed on, for example, a floor or a desk. As such, it can be presumed that a person is located in a position which, in terms of a vertical direction, is not far off as viewed from the charging station 2 and the smartphone 1 (that is, a position at which the person can be detected without the need for rotation in the vertical direction). In the above-described process, the person detecting section 13 searches for a person while the direction that the smartphone 1 faces is shifted left and right. The process therefore makes it possible to detect the person more efficiently.

In a case where a direction of a person is not far off from the direction which the charging station 2 faces at commencement of rotation, the above process makes it possible for the person detecting section 13 to more quickly detect the person, as compared to a configuration in which the charging station 2 begins by rotating through a maximum angle possible. Furthermore, after the charging station 2 has been rotated over a span of 90° in the left and right directions, the charging station 2 is then controlled to rotate through the maximum angle possible (180°), so that the search is performed thoroughly. This makes it possible to detect a person even in a case where the direction of the person is far off from the direction which the charging station 2 faces at commencement of rotation.

Embodiment 4

A terminal device in accordance with the present disclosure may include a proximity sensor. A control device in accordance with the present disclosure may be configured such that, in a case where the proximity sensor has detected that a user has come into proximity, the control device transmits to a cradle a stop instruction for stopping rotation of the cradle. The following description will discuss Embodiment 4 of the present disclosure with reference to FIGS. 10 to 12.

Figure 10:
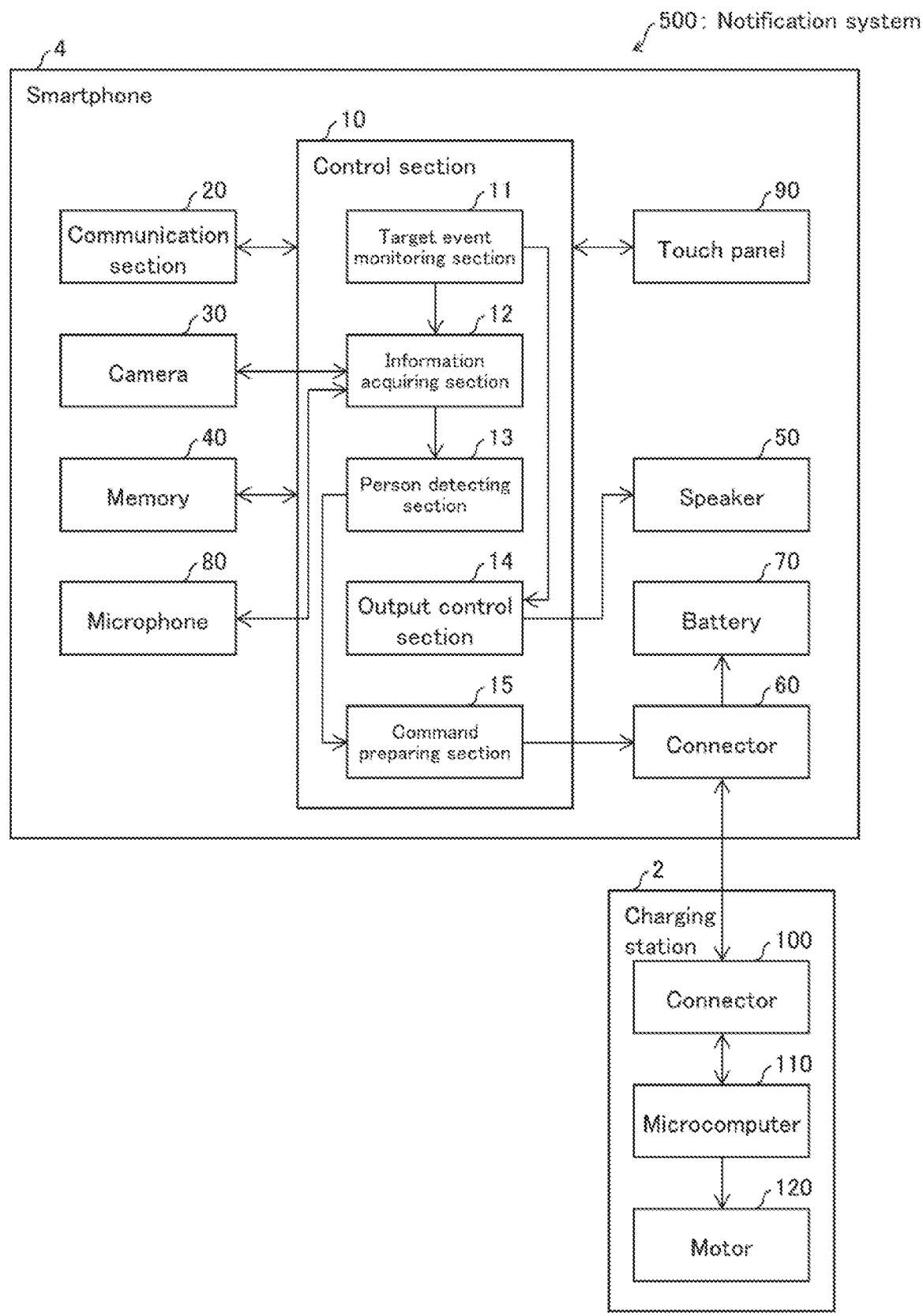
FIG. 10 is a diagram illustrating a configuration of main parts of a smartphone and a charging station which are included in notification system in accordance with Embodiment 4 of the present disclosure.

FIG. 10 is a diagram illustrating a configuration of main parts of a smartphone 4 and a charging station 2 in accordance with Embodiment 4. The smartphone 4 in accordance with Embodiment 4 differs from the smartphone 1 and 3 of the foregoing embodiments in that the former includes a touch panel 90 as an example of a proximity sensor. Upon detecting a touch input which a user has carried out on a detection surface, the touch panel 90 transmits, to a control section 10, information indicating the input.

In a case where the control section 10 has received, from the touch panel 90, the information indicating the input, the control section 10 determines that a person has come into proximity to the smartphone 4. Furthermore, in a case where the control section 10 has determined that a person has come into proximity at a point in time that is (i) after a command preparing section 15 has transmitted a rotation instruction or a subtle rotation instruction and (ii) before the command preparing section 15 has transmitted a stop instruction, the command preparing section 15 prepares and transmits a stop instruction. In a case where the command preparing section 15 has transmitted the stop instruction while a person detecting section 13 is carrying out a search for a person, the person detecting section 13 stops the search.

Figure 11:
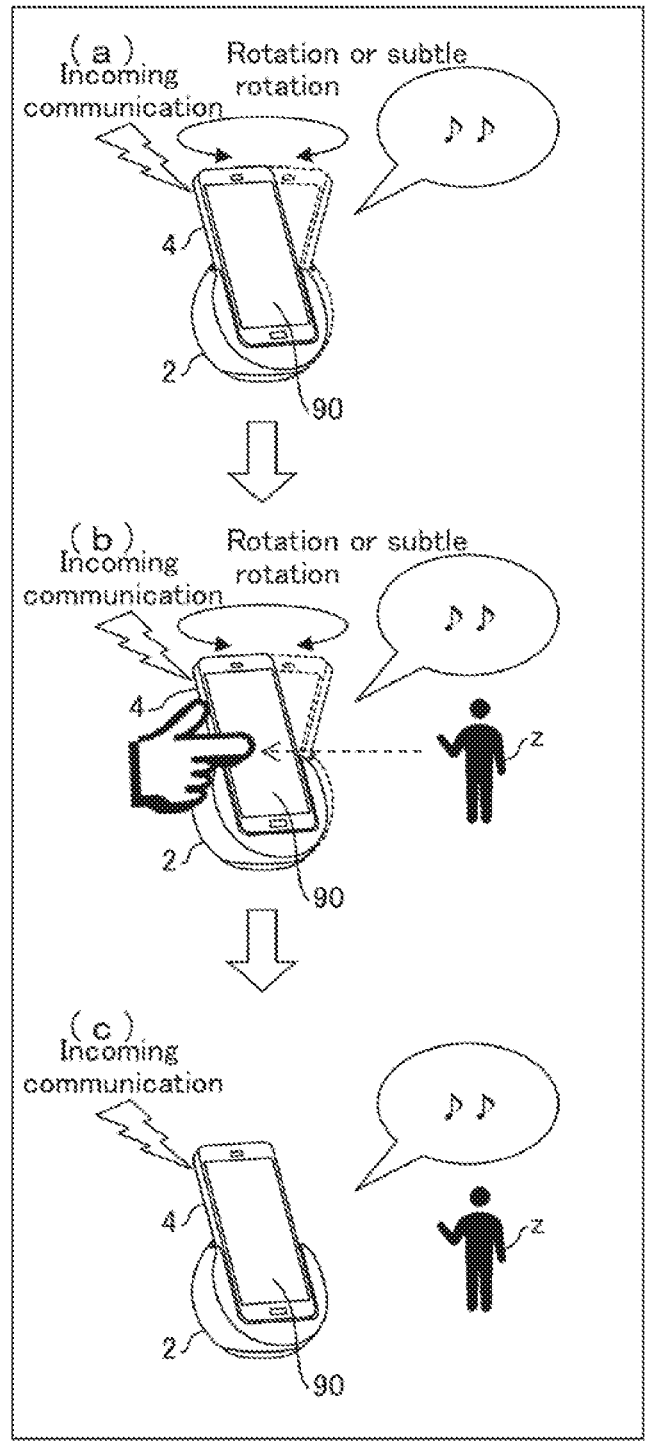
FIG. 11 is a diagram illustrating an example operation of the smartphone and the charging station in a case where a user has touched the smartphone while the charging station is rotating or making a subtle rotation.

Each of (a) to (c) of FIG. 11 is a diagram illustrating an example operation of the smartphone 4 and a charging station 2 in a case where a user z has touched the smartphone 4 while the charging station 2 is rotating or making a subtle rotation. In a case where while the charging station 2 is rotating or making a subtle rotation ((a) of FIG. 11) the user z touches the touch panel 90 ((b) of FIG. 11), the touch panel 90 transmits, to the control section 10, information indicating the touch input. Once the control section 10 has received the information indicating the touch input; the command preparing section 15 prepares a stop instruction and transmits the stop instruction to the charging station 2. A microcomputer 110 then stops the rotation or subtle rotation of the housing 200 in accordance with the stop instruction ((c) of FIG. 11). Note that in a case where the control section 10 has received the information indicating the touch input; an output control section 14 may control a speaker 50 to stop audio output. Furthermore, in a case where the control section 10 has received the information, the command preparing section 15 may prepare and transmit, instead of the stop instruction, an instruction (speed reduction instruction) for causing the housing 200 to rotate at a speed which is slower than a rotation speed specified in the rotation instruction. The microcomputer 110 may then reduce the rotation speed of the housing 200 in accordance with the instruction.

Figure 12:
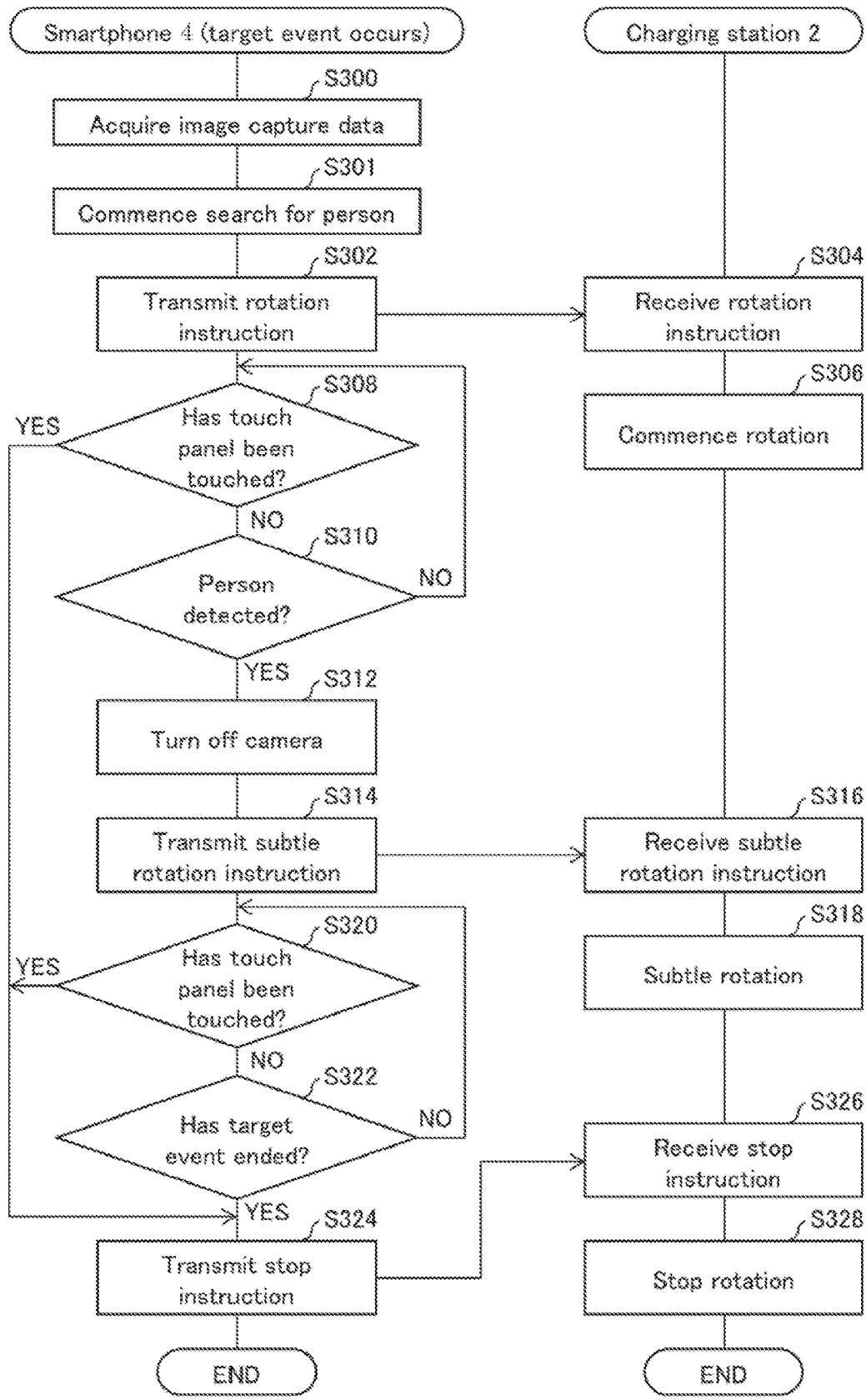
FIG. 12 is a flowchart illustrating another example process carried out by the smartphone and the charging station for rotating the charging station.

FIG. 12 is a flowchart illustrating a flow of another example process carried out by the smartphone 4 and the charging station 2 for rotating the charging station 2. The flowchart of FIG. 12 differs from the flowchart of FIG. 5 described for Embodiment 1 in that the former includes steps S308 and S320. Note that steps other than S308 and S320 are similar to those in the flowchart of FIG. 5, and thus a description of such is omitted here. Steps S300 to S306 correspond to steps S100 to S106. Steps S310 to S318 correspond to steps S108 to S116. Steps S322 to S328 correspond to steps S118 to S124.

During a period which is (i) after the command preparing section 15 has transmitted a rotation instruction (S302), and (ii) until the person detecting section 13 detects a person ("YES" in S310), in a case where the touch panel 90 has detected no touch (touch input) ("NO" in S308), the process carried out by the smartphone 4 proceeds similarly to that illustrated in FIG. 5. However, in a case where the touch panel 90 has detected a touch (touch input) ("YES" in S308), the command preparing section 15 of the control section 10 prepares a stop instruction and transmits the stop instruction to the charging station 2 (S324). The microcomputer 110 then stops the rotation or subtle rotation (or reduces rotation speed) of the housing 200 in accordance with the stop instruction (S326 to S328).

During a period which is (i) after the command preparing section 15 has transmitted a subtle rotation instruction (S314) and (ii) until the target event monitoring section 11 detects that the target event has ended (S322), in a case where the touch panel 90 has detected no touch (touch input) ("NO" in S320), the process carried out by the smartphone 4 proceeds similarly to that illustrated in FIG. 5. However, in a case where the touch panel 90 has detected a touch (touch input) ("YES" in S320), the command preparing section 15 of the control section 10 prepares a stop instruction and transmits the stop instruction to the charging station 2 (S324). The microcomputer 110 then stops the rotation or subtle rotation (or reduces rotation speed) of the housing 200 in accordance with the stop instruction (S326 to S328).

Note that the smartphone 4 may include a proximity sensor such as an infrared sensor, in addition to or instead of the touch panel 90. With such a configuration, the control section 10 may detect a person based on information received from the proximity sensor, and in a case where a person is detected, the command preparing section 15 may prepare and transmit a stop instruction (or a speed reduction instruction). Furthermore, the smartphone 4 may include a microphone as a proximity sensor. With such a configuration, in a case where audio recording data from the microphone includes speech, the control section 10 may determine that a person has been detected, and the command preparing section 15 may prepare and transmit a stop instruction.

For example, in a case where a person suddenly removes the terminal device from the cradle, if the cradle is rotating, there may be an impact between the terminal device and the cradle, and the terminal device may be dropped. The above process, however, makes it possible to prevent such an impact and drop and makes it possible for a person to safely remove the terminal device from the cradle. Furthermore, in a case where the command preparing section 15 transmits a stop instruction, the charging station 2 is prevented from rotating unnecessarily when a person is already in proximity to the smartphone 4 (when the person is already aware of the notification from the smartphone 4). This makes it possible to reduce power consumption by the charging station 2.

While the charging station 2 is rotating or making a subtle rotation, the output control section 14 may control the speaker 50 to output audio which prompts a person to carry out an input operation on the touch panel 90. More specifically, the output control section 14 may, for example, control the speaker 50 to output audio which prompts the user to first touch the touch panel 90 before removing the smartphone 4 from the charging station 2.

This configuration makes it possible to prevent a person from grasping the charging station 2 or attempting to remove the smartphone 4 from the charging station 2 while the charging station 2 is rotating or making a subtle rotation. The configuration therefore makes it possible to prevent an impact or drop when the smartphone 4 is being removed from the charging station 2, and makes it possible for a person to safely remove the smartphone 4. The above-described prompting via audio also makes it possible to quickly make a person in the area surrounding the smartphone 4 aware of a notification.

[Variations]

The charging station 2 may include a speaker and an output control section. In such a case, the charging station 2 may receive from the command preparing section 15 an instruction for audio output and carry out operations similar to those of the speaker 50 and the output control section 14 of the smartphone 1, 3, or 4.

Furthermore, instead of transmitting the rotation instruction, the subtle rotation instruction, and the stop instruction, the command preparing section 15 may transmit to the microcomputer 110 of the charging station 2, for example, information indicating that a target event has occurred or ended, information indicating that detection of a person has commenced or been terminated, and information indicating that a person has been detected. The microcomputer 110 may then (i) determine, in accordance with the information, whether the housing 200 should rotate, make a subtle rotation, or stop, and (ii) control the motor 120 in accordance with the determination thus made.

[Software Implementation Example]

Control blocks of the control section 10 can be realized by a logic circuit (hardware) provided in an integrated circuit (IC chip) or the like or can be alternatively realized by software as executed by a central processing unit (CPU).

In the latter case, the control section 10 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be made available to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

Aspects of the present invention can also be expressed as follows:

A control device (control section 10) in accordance with Aspect 1 of the present invention is a control device which controls a terminal device smartphone 1, 3, or 4) mounted to a cradle (charging station 2), including: a person detecting section (person detecting section 13) configured to search for and detect a person in an area surrounding the terminal device with use of information indicating a state of the area surrounding the terminal device, in a case where a specific event (target event) has occurred in the terminal device; an output control section (output control section 14) configured to control an output section (speaker 50) to output audio indicating the specific event; an instruction transmitting section (command preparing section 15) configured to (i) transmit a first rotation instruction (rotation instruction) to the cradle in a case where the person detecting section is to commence a search, the first rotation instruction being for rotating the cradle and (ii) transmit a second rotation instruction (subtle rotation instruction) to the cradle in a case where, as a result of the search, the person detect g section has detected the person, the second rotation instruction being for rotating the cradle in a mode of rotation which mode differs from that of the first rotation instruction.

With the above configuration, the control device controls the cradle to rotate when detection of a person is to be carried out. This makes it possible for the control device to search for a person with use of information obtained while the terminal device is facing differing directions. In a case where the control device has detected a person, the control device does the following: (i) control the cradle to rotate in a mode of rotation that differs from the rotation carried out during the search for the person; and (ii) control the output section to output audio.

The control device is therefore able to notify a person in the area surrounding the terminal device that an event has occurred, with use of a combination of audio and rotation of the cradle. The control device therefore makes it possible to more effectively provide notification of various information to a user.

In Aspect 2 of the present invention, the control device in accordance with Aspect 1 may be configured such that the second rotation instruction is for rotating the cradle through an angle of rotation which is smaller than an angle of rotation instructed by the first rotation instruction and (measured with respect to a direction that the cradle faces when the person detecting section detects the person.

The above configuration makes it possible for the control device to control the cradle to rotate through an angle of rotation which is (i) smaller than an angle of rotation used when searching for a person and (ii) measured with respect to a direction of the person. This makes it possible for the control device to more easily make a person in the area surrounding the terminal device aware of a notification.

In Aspect 3 of the present invention, the control device in accordance with Aspect 2 may be configured such that: in a case where the person detecting section has detected the person, the instruction transmitting section transmits to the cradle a stop instruction for stopping rotation being carried out in accordance with the first rotation instruction, and subsequently transmits the second rotation instruction; in the second rotation instruction, a direction that the cradle faces when the cradle stops rotating in accordance with the stop instruction is considered to be direction that the cradle faces when the person detecting section detects the person; and the second rotation instruction instructs the cradle to repeatedly rotate left and right through a predetermined angle of rotation which is measured with respect to the direction that the cradle faces when the cradle stops rotating in accordance with the stop instruction.

The above configuration makes it possible for the control device to control the cradle to repeatedly rotate through an angle of rotation measured with respect to the direction which the cradle faces the direction of the person. This makes it possible for the control device to control the terminal device mounted to the cradle to, for example, move in a manner similar to shaking one's head while facing the person. This makes it possible for the control device to more easily make a person in the area surrounding the terminal device aware of a notification.

In Aspect 4 of the present invention, the control device in accordance with any one of Aspects 1 through 3 may be configured such that once the specific event has occurred, the output control section controls the output section to output the audio indicating the specific event until the specific event ends.

The above configuration makes it possible for the control device to provide audio notification indicating that an event has occurred, even while searching for a person. This makes it possible for the control device to more easily make a person in the area surrounding the terminal device aware of a notification.

In Aspect 5 of the present invention, the control device in accordance with any one of Aspects 1 through 3 may be configured such that the output control section controls the output section to output the audio indicating the specific event after the person detecting section has detected the person.

With the above configuration, it is after a person has been detected that the control device provides audio notification that an event has occurred. This enables the control device to reliably provide notification of the event to a person in the area surrounding the terminal device.

A terminal device (smartphone 1, 3, or 4) in accordance with Aspect 6 of the present invention includes the control device in accordance with any one of Aspects 1 through 5. The above configuration brings about effects similar to those of the control device of Aspect 1.

A cradle (charging station 2) in accordance with Aspect 7 of the present invention includes: an instruction receiving section (microcomputer 110) configured to receive instructions from the control device in accordance with any one of Aspects 1 through 5; and an operation section (motor 120) configured to (i) cause a housing of the cradle to rotate in a case where the instruction receiving section has received the first rotation instruction and (ii) cause the housing to rotate in a mode of rotation which mode differs from that of the first rotation instruction, in a case where the instruction receiving section has received the second rotation instruction. The above configuration brings about effects similar to those of the control device of Aspect 1.

A notification system (notification system 500) in accordance with Aspect 8 of the present invention includes: the control device (control section 10) in accordance with any one of Aspects 1 through 5; the terminal device (smartphone 4) in accordance with Aspect 6; and the cradle (charging station 2) in accordance with Aspect 7. The above configuration brings about effects similar to those of the control device of Aspect 1.

A method of control for a control device in accordance with Aspect 9 of the present invention is a method of control for a control device which controls a terminal device (smartphone 1, 3, or 4) mounted to a cradle (charging station 2), the method including the steps of: (a) searching for and detecting a person in an area surrounding the terminal device with use of information indicating a state of the area surrounding the terminal device, in a case where a specific event (target event) has occurred in the terminal device (S101 or S301); (b) controlling an output section to output audio indicating the specific event; (c) transmitting a first rotation instruction to the cradle in a case where a search is to be commenced in the step (a), the first rotation instruction being for rotating the cradle (S102 or S302); and (d) transmitting a second rotation instruction to the cradle in a case where, as a result of the search, the person has been detected, the second rotation instruction being for rotating the cradle in a mode of rotation which mode differs from that of the first rotation instruction (S112 or S314).

A control device in accordance with each aspect of the present invention can be realized by a computer. The computer is operated based on (i) a control program for causing the computer to realize the control device by causing the computer to operate as each section (software element) included in the control device and (ii) a computer-readable storage medium in which the control program is stored. Such a control program and a computer-readable storage medium are included in the scope of the present invention.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Smartphone (terminal device
2 Charging station (cradle)
10 Control section (control device)
11 Target event monitoring section
12 information acquiring section
13 Person detecting section
14 Output control section
15 Command preparing section (instruction transmitting section)
20 Communication section
30 Camera
40 Memory
50 Speaker (output section)
60 Connector
70 Battery
80 Microphone
90 Touch panel
100 Connector
110 Microcomputer (instruction receiving section)
120 Motor (operation section)
200 Housing
210 Steadying section
220 Cable
500 Notification system

The invention claimed is:

1. A control device which controls a terminal device mounted to a cradle, comprising:
  person detecting circuitry configured to search for and detect a person in an area surrounding the terminal device with use of information indicating a state of the area surrounding the terminal device, in a case where a specific event has occurred in the terminal device;
  output control circuitry configured to control output circuitry to output audio indicating the specific event;
  instruction transmitting circuitry configured to (i) transmit a first rotation instruction to the cradle in a case where the person detecting circuitry is to commence a search, the first rotation instruction being for rotating the cradle and (ii) transmit a second rotation instruction to the cradle in a case where, as a result of the search, the person detecting circuitry has detected the person, the second rotation instruction being for rotating the cradle in a mode of rotation which mode differs from that of the first rotation instruction, wherein
  the second rotation instruction is for rotating the cradle through an angle of rotation which is (i) smaller than an angle of rotation instructed by the first rotation instruction and (ii) measured with respect to a direction that the cradle faces when the person detecting circuitry detects the person
  in a case where the person detecting circuitry has detected the person, the instruction transmitting circuitry transmits to the cradle a stop instruction for stopping rotation being carried out in accordance with the first rotation instruction, and subsequently transmits the second rotation instruction;
  in the second rotation instruction, a direction that the cradle faces when the cradle stops rotating in accordance with the stop instruction is considered to be direction that the cradle faces when the person detecting circuitry detects the person; and
  the second rotation instruction instructs the cradle to repeatedly rotate left and right through a predetermined angle of rotation which is measured with respect to the direction that the cradle faces when the cradle stops rotating in accordance with the stop instruction.

2. The control device as set forth in claim 1, wherein once the specific event has occurred, the output control circuitry controls the output circuitry to output the audio indicating the specific event until the specific event ends.

3. The control device as set forth in claim 1, wherein the output control circuitry controls the output circuitry to output the audio indicating the specific event after the person detecting circuitry has detected the person.

4. A terminal device comprising:
  the control device recited in claim 1;
  the output circuitry; and
  a connector connected with the cradle.

5. A cradle comprising:
  instruction receiving circuitry configured to receive instructions from the control device recited in claim 1; and
  operation circuitry configured to (i) cause a housing of the cradle to rotate in a case where the instruction receiving circuitry has received the first rotation instruction and (ii) cause the housing to rotate in a mode of rotation which mode differs from that of the first rotation instruction, in a case where the instruction receiving circuitry has received the second rotation instruction.

6. A notification system comprising:

the control device recited in claim 1;

a terminal comprising the control device; and a cradle comprising:

instruction receiving circuitry configured to receive instructions from the control device; and operation circuitry configured to (i) cause a housing of the cradle to rotate in a case where the instruction receiving circuitry has received the first rotation instruction and (ii) cause the housing to rotate in a mode of rotation which mode differs from that of the first rotation instruction, in a case where the instruction receiving circuitry has received the second rotation instruction.

7. A non-transitory computer-readable storage medium storing therein a control program for causing a computer to function as the control device recited in claim 1, the control program causing the computer to function as the person detecting circuitry, the output control circuitry, and the instruction transmitting circuitry.

8. A method of control for a control device which controls a terminal device mounted to a cradle, the method comprising the steps of:

(a) searching for and detecting a person in an area surrounding the terminal device with use of information indicating a state of the area surrounding the terminal device, in a case where a specific event has occurred in the terminal device;

(b) controlling output circuitry to output audio indicating the specific event;

(c) transmitting a first rotation instruction to the cradle in a case where a search is to be commenced in the step (a), the first rotation instruction being for rotating the cradle; and (d) transmitting a second rotation instruction to the cradle in a case where, as a result of the search, the person has been detected, the second rotation instruction being for rotating the cradle in a mode of rotation which mode differs from that of the first rotation instruction, wherein the second rotation instruction is for rotating the cradle through an angle of rotation which is (i) smaller than an angle of rotation instructed by the first rotation instruction and (ii) measured with respect to a direction that the cradle faces when the person detecting circuitry detects the person in a case where the person detecting circuitry has detected the person, the instruction transmitted to the cradle a stop instruction for stopping rotation being carried out in accordance with the first rotation instruction, and subsequently transmits the second rotation instruction;

in the second rotation instruction, a direction that the cradle faces when the cradle stops rotating in accordance with the stop instruction is considered to be direction that the cradle faces when the person detecting circuitry detects the person; and the second rotation instruction instructs the cradle to repeatedly rotate left and right through a predetermined angle of rotation which is measured with respect to the direction that the cradle faces when the cradle stops rotating in accordance with the stop instruction.

* * * * *